United States Patent [19]

Sinsky

[11] Patent Number: 4,994,810
[45] Date of Patent: Feb. 19, 1991

[54] MONOPULSE PROCESSOR DIGITAL CORRECTION CIRCUIT

[75] Inventor: Allen I. Sinsky, Baltimore, Md.

[73] Assignee: Allied-Signal Inc., Morris Township, Morris County, N.J.

[21] Appl. No.: 498,792

[22] Filed: Mar. 26, 1990

[51] Int. Cl.$^5$ .................. G01S 13/44; G01S 7/40
[52] U.S. Cl. .................. 342/151; 342/174; 342/194
[58] Field of Search .................. 342/151, 174, 194

[56] References Cited

U.S. PATENT DOCUMENTS

| | | | |
|---|---|---|---|
| 3,950,750 | 4/1976 | Churchill et al. | 342/174 |
| 4,003,054 | 1/1977 | Goldstone | 342/174 |
| 4,021,804 | 5/1977 | Dounce et al. | 342/194 |
| 4,040,055 | 8/1977 | Donahue et al. | 342/174 X |
| 4,484,194 | 11/1984 | Arvidsson | 342/174 |
| 4,905,010 | 2/1990 | Baechtiger et al. | 342/151 |

OTHER PUBLICATIONS

F. E. Churchill et al., "The Correction of I and Q Errors in a Coherent Processor", IEEE, Transactions on Aerospace and Electronic Systems, vol. AES-17, No. 1, Jan. 1981, pp. 131–137.

A. I. Sinksy et al., "Error Analysis of a Quadrature Coherent Detector Processor", IEEE, Transactions on Aerospace and Electronic Systems, vol. AES-10, No. 6, Nov. 1974, pp. 880–883.

Primary Examiner—Gilberto Barrón, Jr.
Attorney, Agent, or Firm—Howard G. Massung

[57] ABSTRACT

A method and correction circuit is described incorporating a monopulse receiver, injecting a first signal of known amplitude and arbitrary phase and a second signal of the same amplitude shifted 90° and measuring the output voltages of the channel and using the measurements to generate four coefficients which may be mathematically applied to the ouptut signals of the channel to provide a corrected output. The invention overcomes the problem of compensating for phase and gain drift in the in-phase and quadrature paths of the sum and difference channels of a monopulse receiver.

8 Claims, 4 Drawing Sheets

MONOPULSE PROCESSOR DIGITAL CORRECTION CIRCUIT

BACKGROUND OF THE INVENTION

1. Field of the Invention

This invention relates to the calibration of analog circuitry in a monopulse receiver and more particularly to a digital correction circuit for compensating drifts and anomalies in phase and gain between quadrature channels.

2. Description of the Prior Art

A number of airports in the United States have parallel runways for the landing and take off of airplanes. When the weather is inclement so that the runways may not be visually observed by the pilot, one runway is shut down allowing only one runway to be used during periods of inclement weather.

A precision runway monitor may be provided to receive RF signals radiated by airplanes in response to a ground based air traffic control station. A monopulse radar receiver positioned to scan the area of airplanes flying an approach pattern to land on one or the other runway may be tracked from the signals radiated by the respective airplane. A requirement was established that the monopulse radar receiver should have an azimuth accuracy of 60 feet at a range of 60,000 feet which corresponds to 0.057° accuracy. By using the resulting resolution, aircraft approaching the runway may be prevented from colliding into one another and assured of a landing on the correct runway. For example, the runways may be parallel to one another and spaced apart by 3,500 feet. The precision runway monitor may be placed on the ground midway between the two runways.

A typical monopulse receiver would have an antenna which simultaneously generates a sum and difference signal-in response to a received signal emanated by an aircraft. In order to process all the energy that is received indicative of location, the sum signal and difference signal are each processed by in phase and quadrature channels. It is well known that different gain and phase variations in the in-phase and quadrature channels result in an associated error in the sum signal and the difference signal which ultimately results in an error in the azimuth measurements of the incoming signals.

In a publication by F. E. Churchill et al. entitled "The Correction of I and Q Errors In A Coherent Processor", IEEE Transactions on Aerospace and Electronic Systems, Vol. AES-17, No. 1, January, 1981, pp. 131-137, a method is presented for correcting the I and Q channel errors by means of correction coefficients which are derived from measurements of a test signal. The required correction coefficients can be obtained from time samples of a test signal. By taking the discrete Fourier transformation (DFT) of the samples, three-digital filters are formed at dc, the test signal frequency, and the image of the test signal frequency. By using a simple algorithm, errors in gain may be inserted into one channel and errors in phase may be inserted into the other channel.

In U.S. Pat. No. 4,040,055 which issued on Aug. 2, 1977 to T. H. Donahue et al. entitled "Digital Compensator For Transmitter Instability", the in-phase and quadrature coherent phase detector outputs are continuously monitored for phase, amplitude and timing instabilities and arithmetic correction signals are generated and applied to the digitized received signal values to compensate for these instabilities.

In U.S. Pat. No. 4,021,804 which issued on May 3, 1977 to Dounce et al., the use of digital techniques is described for storage and for phase correction processing of the received signals in a coherent-on-receive pulse radar system. The phases of the received video signals are corrected by first converting the video signals to a series of complex digital numbers indicating the amplitude and phase of the received signals with respect to the stable local oscillator. The stored complex digital numbers are then operated on by a digital data processor to provide a new series of digitally corrected complex numbers representing coherent received video signals.

In a publication by A. I. Sinsky and P. C. P. Wang, entitled "Error Analysis of a Quadrature Coherent Detector Processor", IEEE Transactions On Aerospace and Electronic Systems, Vol. AES-10, No. 6, November, 1974, pp. 880-883, the output signal distortion resulting from relative phase and gain errors between two quadrature detector channels of a baseband processing system is computed.

SUMMARY OF THE INVENTION

In accordance with the present invention, a digital correction circuit and method is provided for closed loop digital compensation of phase and gain drift in a channel of a monopulse receiver comprising the steps of injecting a first signal of known amplitude and arbitrary phase into the channel, measuring the uncorrected in-phase and quadrature channel voltages to provide values $I_1$ and $Q_1$, inserting a 90° phase shift in the first signal to provide a second signal, injecting the second signal into the channel, measuring the uncorrected in-phase and quadrature channel voltages to provide values $I_2$ and $Q_2$, computing four correction coefficients $K_1$, $K_2$, $K_3$ and $K_4$ from the values $I_1$, $Q_1$, $I_2$ and $Q_2$, and applying the coefficients to the output signals of the in-phase and quadrature channel voltages to provide third and fourth signals having compensation for phase and gain drift.

It is an object of the invention to increase the angle accuracy of a monopulse receiver by compensating for phase and gain drift of the sum beam in-phase and quadrature channels and the difference beam in phase and quadrature channels.

It is a further object of the invention to provide coefficients which may be multiplied with the output signals to provide values which may be added together to provide a compensated output signal.

It is a further object of the invention to perform computations of correction coefficients periodically which may be then averaged together to form new coefficients, for example, every minute.

It is a further object of the invention to use an analog to digital converter to convert the signals to digital values which may facilitate the speedy computation of the correction coefficients and of the compensated signals of the sum and difference beams.

DESCRIPTION OF THE PREFERRED EMBODIMENTS

Figure 1:
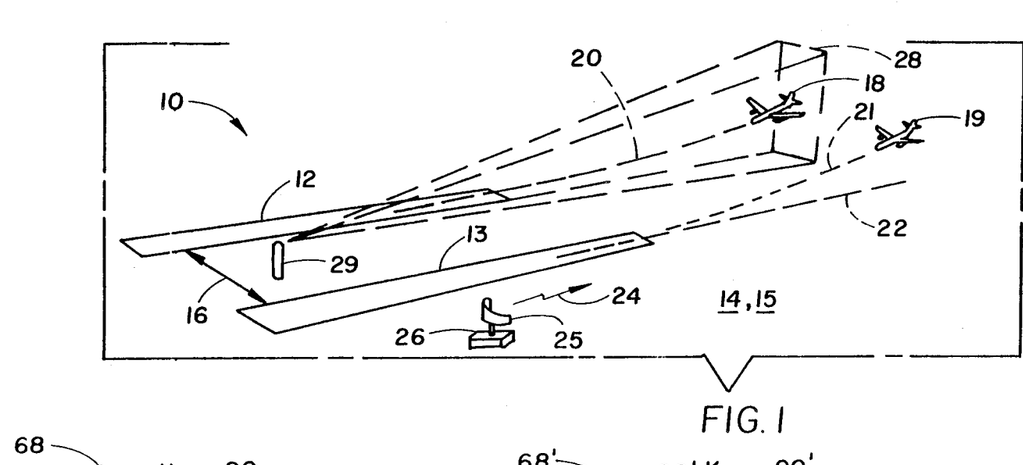
FIG. 1 is a pictorial view of parallel runways with airplanes in an acceptable approach pattern.

Referring now to the drawings, FIG. 1 shows an airport 10 having parallel runways 12 and 13 positioned on a surface 14 of earth 15. Runways 12 and 13 are spaced apart by a predetermined distance, for example, 1,066.80 meters (3,500 feet) as shown by arrow 16. Airplanes or aircraft 18 and 19 may be on a landing approach along glide paths 20 and 21 to runways 12 and 13 respectively. The path of glide path 21 on earth surface 14 is shown by reference line 22.

An air traffic control signal may be radiated by antenna 29 towards airplanes 18 and 19. Airplanes 18 and 19 may both be carrying air traffic control transponders which upon receiving a predetermined interrogation signal by way of antenna 29 will radiate a return signal which may have encoded therein information to identify the specific aircraft emanating the reply and its altitude. Antenna 29 receives the reply signals from airplanes 18 and 19 and process them in a monopulse receiver to decode the information and determine the angle of their arrival from airplanes 18 and 19 respectively. A signal received from airplane 18 may be resolved within a volume shown by outline 28. The range may be determined by the delayed time from the original interrogation pulse from antenna 29 to the reception of the reply signal and subtracting therefrom a fixed delay that the transponder on the airplane adds prior to transmitting a reply pulse. Antenna 29 may be positioned midway between runways 12 and 13 and towards the end of the runway furthest from the approaching aircraft.

Figure 2A:
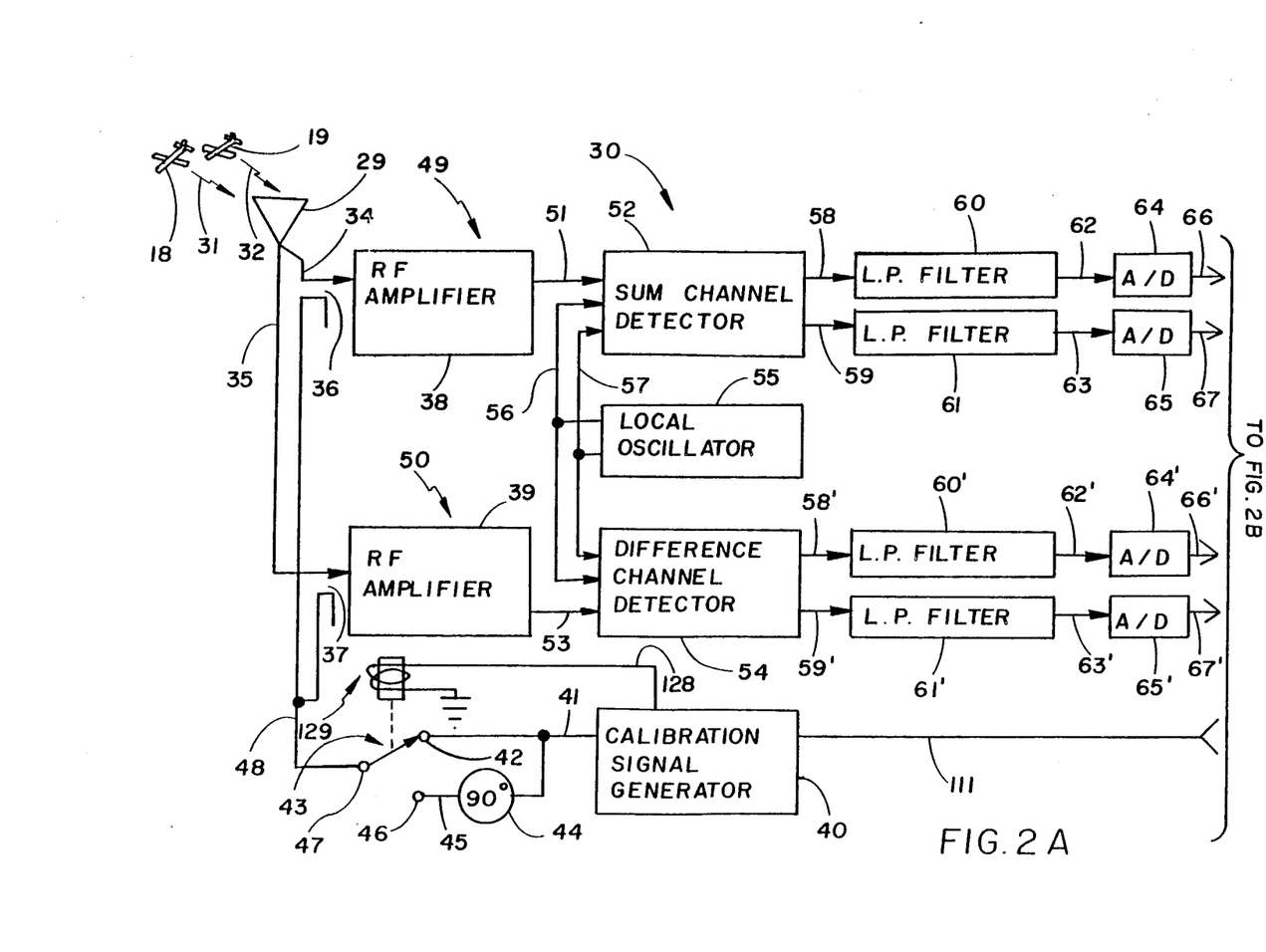
FIGS. 2A and 2B assembled is a block diagram of one embodiment of the invention.
Figure 2B:
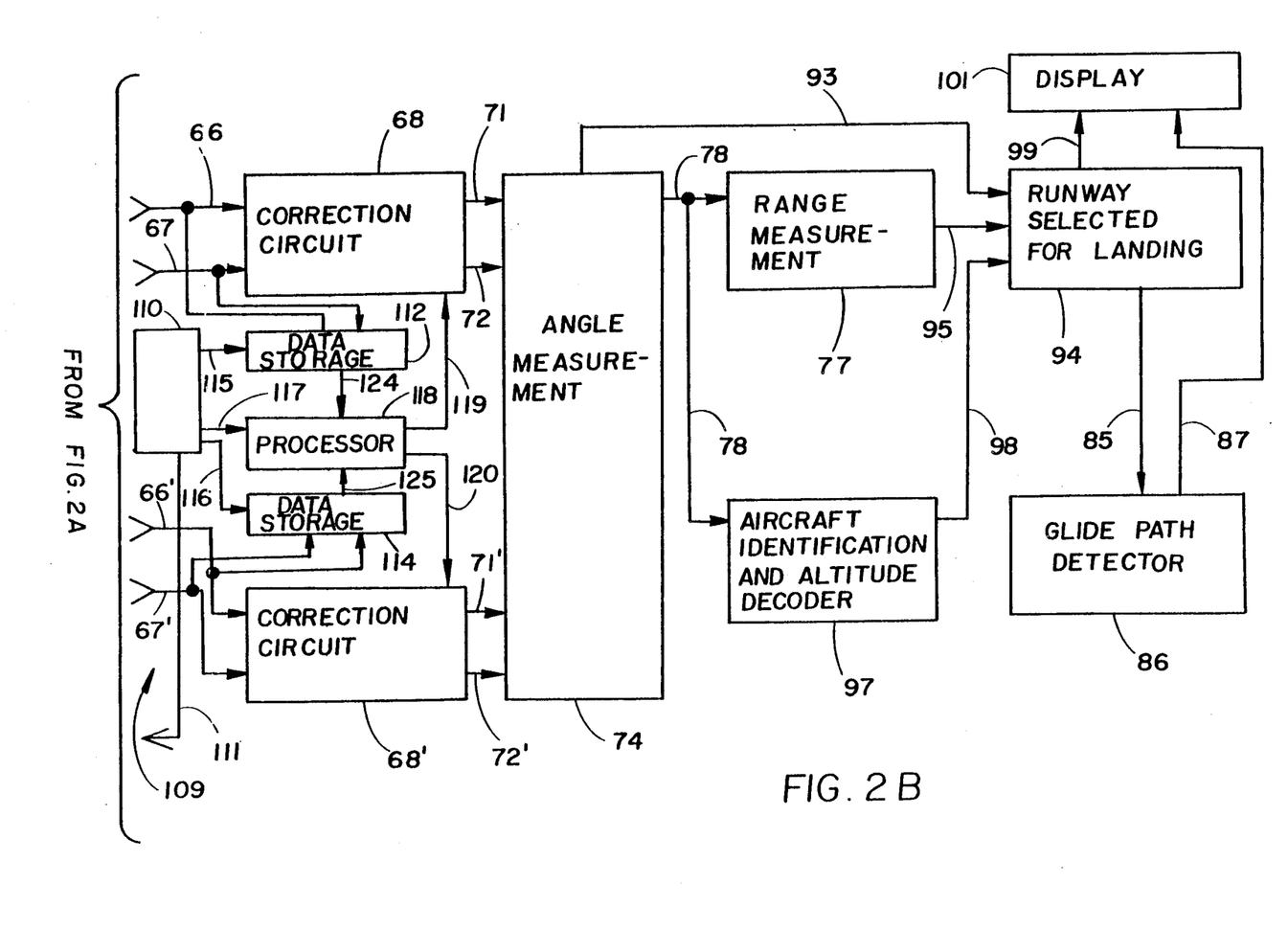

Referring now to FIGS. 2A and 2B, a block-diagram of a monopulse receiver 30 is shown. Reply signals to an air traffic control interrogation from aircraft 18 and 19 is shown by arrows 31 and 32 to antenna 29. Antenna 29 is configured to combine the signals to provide a sum channel over lead 34 and a difference channel over lead 35 to an input of RF amplifiers 38 and 39 respectively. Calibration signal generator 40 functions to provide a first signal of known amplitude and of arbitrary phase over lead 41. Lead 41 is coupled to terminal 42 of switch 43 and to one side of 90 degree phase shifter 44. The other side of phase shifter 44 is coupled over lead 45 to terminal 46 of switch 43. Switch 43 functions as a single pole double throw switch which functions to couple terminal 47 to terminal 42 or to terminal 46. Terminal 47 is coupled over lead 48 to an input of couplers 36 and 37. Calibration signal generator 40, 90° phase shift 44 switch 43 and couplers 36 and 37 function to inject a first test signal of known amplitude and of arbitrary phase into the sum and difference channels 49 and 50 of monopulse receiver 30 during a first time. And at a second time to inject a second signal having a 90° phase shift with respect to the first signal into sum channel 49 and difference channel 50.

The output of RF amplifier 38 is coupled over lead 51 to an input of sum channel detector 52 which may include, for example, two mixers. The output of RF amplifier 39 is coupled over lead 53 to an input of difference channel detector 54 which may include for example two mixers. Local oscillator 55 provides a first frequency signal over lead 56 to an input of sum channel detector 52 and difference channel detector 54. Local oscillator 55 also provides a second signal over lead 57 suitable for mixing. The frequency signal on lead 57 is shifted 90° in phase with respect to the frequency signal on lead 56 which are at the same frequency. Sum channel detector 52 functions to provide an in-phase signal over lead 58 and a quadrature signal over lead 59 to respective inputs of low pass filters 60 and 61. The output of low pass filters 60 and 61 is coupled over leads 62 and 63 to respective inputs of analog to digital converters 64 and 65. Low pass filters 60 and 61 function to select the lower frequency (usually base band video) when mixing the signals on leads 56 and 57 with the frequency on lead 51. Analog to digital converters 64 and 65 function to convert by sampling the analog signals on leads 62 and 63 at a rate of at least twice the frequency of the information components contained on leads 62 and leads 63. The output of analog to digital converter 64 and 65 is coupled over leads 66 and 67 to respective inputs of correction circuit 68. Correction circuit 68 further functions to apply coefficients $K_1$, $K_2$, $K_3$ and $K_4$ to the output signals of the in-phase and quadrature signals on leads 66 and 67 to provide third and fourth signals over leads 71 and 72 respectively, having compensation for phase and gain drift in sum channel 49 Leads 71 and 72 are coupled to respective inputs of angle measurement 74.

Difference channel 50 has reference numerals with like reference numbers as sum channel 49 except for the numbers being primed. Difference channel 50 and its components function in like manner as the corresponding reference numerals in the sum channel 49. In-phase and quadrature signals on leads 71' and 72' respectively have been compensated for phase and gain drift by correction circuit 68'.

Circuitry 109 for periodic computation of the coefficients $K_1$ through $K_8$ for use by correction circuit 68 and 68' is shown in FIG. 2B. Calibration controller 110 provides a signal over lead 111 to calibration signal generator 40 shown in FIG. 2A. Calibration signal generator 40 provides test signals through couplers 36 and 37 to provide the corresponding test voltages on leads 66, 67, 66' and 67' which are coupled to data storage 112 and data storage 114. Calibration controller 110 provides control signals over leads 115 and 116 to data storage 112 and 114 respectively to store the signals during the time respective test signals are inserted by couplers 36 and 37. Calibration controller 110 also provides control signals over lead 117 to processor 118 which functions to compute the coefficients which are provided over leads 119 and 120 to correction circuits 68 and 68'. Samples taken during injection of test signals are coupled from data storage 112 over lead 124 to an input of processor 118 and from data storage 114 over lead 125 to an input of processor 118. Calibration signal generator 40 may provide a signal over lead 128 to solenoid 129 which functions to move switch 43 to its proper position.

Angle measurement 74 functions to determine the angle of the received signal based on the inputs on leads 71 and 72 from sum channel 49 and the inputs of 71' and 72' from difference channel 50. The angle measurement is provided over lead 93 to an input of runway selected for landing 76. An output from angle measurement 74 is passed on to range measurement 77 over lead 78 which may be for example the same signals on leads 71 and 72 from sum channel 49. Range measurements 77 functions to determine the range of the received signals and provides an output over lead 95 to an input of runway selected for landing 94. Lead 78 is coupled to an input of aircraft identification and altitude decoder 97 which functions to decode the signal to determine the identity and altitude of the aircraft. The output of aircraft identification and altitude decoder 97 is coupled over lead 98 to an input of runway selected for landing 94. Runway selected for landing 76 functions to determine from the range measurement and angle measurement the runway selected by the aircraft decoded by aircraft identification and altitude decoder 97. The output of runway selected for landing 94 is coupled over lead 99 to display 101 which functions to display the information. A second output of runway selected for landing 94 is coupled over lead 85 to an input of glide path detector 86 which functions to determine if the aircraft at the respective runway has the appropriate altitude (as determined by aircraft identification and altitude decoder 97), range (as determined by range measurement 7) and azimuth (as determined by angle measurement 4). Glide path detector 86 has an output over lead 87 to an input of display 101 to display appropriate information related to the glide paths of aircrafts 18 and 19 as they approach runways 12 and 13.

Figure 3:
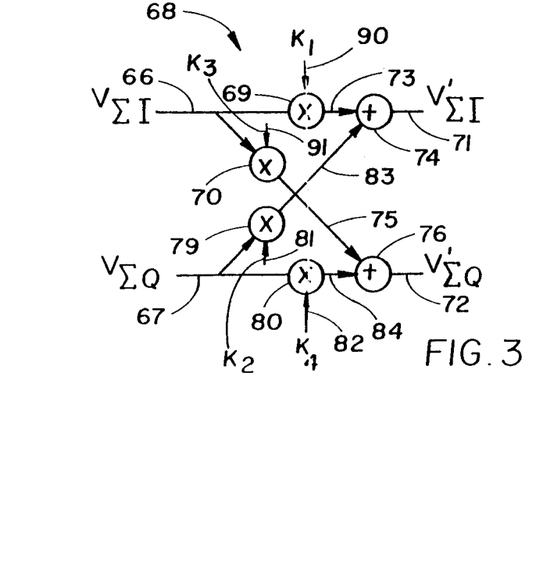
FIG. 3 is one embodiment of a correction circuit.

FIG. 3 shows one embodiment of correction circuit 68 Lead 66 is coupled to an input of multipliers 69 and 70. Multiplier 69 has a second input over lead 90 having a value representative of coefficient $K_1$. Multiplier 70 has a second input over lead 91 having a value representative of coefficient $K_3$. The output of multiplier 69 is coupled over lead 73 to an input of adder 74. The output of multiplier 70 is coupled over lead 75 to an input of adder 76. Lead 67 is coupled to an input of multipliers 79 and 80. A second input of multiplier 79 is coupled over lead 81 which has a value representative of coefficient $K_2$. A second input of multiplier 80 has a input coupled over lead 82 representative of coefficient $K_4$. The output of multiplier 79 is coupled over lead 83 to a second input of adder 74. The output of multiplier 80 is coupled over lead 84 to a second input of adder 76. The output of adder 74 is coupled to lead 71 and the output of adder 76 is coupled to lead 72.

Figure 4:
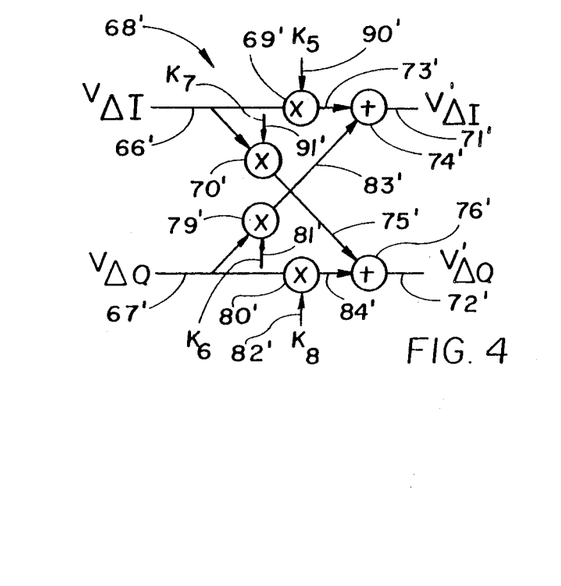
FIG. 4 is a second embodiment of a correction circuit.

FIG. 4 shows one embodiment of correction circuit 68' shown in FIG. 2. In FIG. 4, reference numerals having primes correspond to the function of like reference numerals without primes in FIG. 3. In FIG. 4, coefficient $K_5$ is coupled to lead 90, lead 91 is coupled to coefficient $K_7$, lead 81' is coupled to coefficient $K_6$ and lead 82' is coupled to coefficient $K_8$.

In operation, the signals on leads 66 and 67 as well as 66' and 67' are normally baseband digitized signals from sum channel 49 and difference channel 50 respectively. Correction circuits 68 and 68' shown in FIGS. 3 and 4 respectively, effectively remove the gain and phase errors from sum channel 49 and difference channel 50. Correction circuit 68 and 68' perform a linear transformation of the uncorrected input signals by use of multipliers 69, 70, 79 and 80 and adders 74 and 76 shown in FIG. 3. The corrected output quadrature components on leads 71 and 72 are related to the uncorrected input quadrature components on leads 66 and 67 by equations 1-4.

$$V'_{\Sigma I}=K_1 V_{\Sigma I}+K_2 V_{\Sigma Q} \tag{1}$$

$$V'_{\Sigma Q}=K_3 V_{\Sigma I}+K_4 V_{\Sigma Q} \tag{2}$$

$$V'_{\Delta I}=K_5 V_{\Delta I}+K_6 V_{\Delta Q} \tag{3}$$

$$V'_{\Delta Q}=K_7 V_{\Delta I}+K_8 V_{\Delta Q} \tag{4}$$

The transformation constants $K_1$ through $K_8$ used in correction circuits 68 and 68' are chosen so that the magnitudes of the corrected complex channel outputs are equal to $G_O V_T$ and the phase of the sum and difference channel complex outputs are equal to each other. $G_O$ is the precise value of voltage gain referenced from the couplers 36 and 37 for sum channel 49 and difference channel 50 respectively. The value of $G_O$ is selected based on the dynamic range requirements of monopulse receiver 30. Equations 5-8 concisely define the corrected output signal characteristics when the test signal generated by calibration signal generator 40 and coupled by couplers 36 and 37 is $V_T \exp j\phi$.

$$(V'_{\Sigma I})^2+(V'_{\Sigma Q})^2=(G_O V_T)^2 \tag{5}$$

$$\tan(\phi-\phi_o)=V'_{\Sigma Q}/V'_{\Sigma I} \tag{6}$$

$$(V'_{\Delta I})^2+(V'_{\Delta Q})^2=(G_O V_T)^2 \tag{7}$$

$$\tan(\phi-\phi_o)=V'_{\Delta Q}/V'_{\Delta I} \tag{8}$$

Note that $\phi_0$ is the specific value of the test signal phase at couplers 36 and 37 at the time the values of the coefficients $K_1$-$K_8$ are computed. If the K values then were held constant and the test signal phase was allowed to depart from $\phi_0$, equations 6 and 8 would be satisfied. The values of the K's are such that when the test signal phase is $\phi_0$, then the corrected outputs on lead 72 and 72' are 0 and lead 71 and 71' are equal to $G_O V_T$.

The procedure for establishing the correction coefficients $K_1$ through $K_8$ may be performed as described below. The input test signal switch 43 is set to terminal 42. The test signal amplitude must be precisely $V_T$ at couplers 36 and 37. The test signal phase is arbitrary and is assumed to be $\phi_0$ at the time of calibration. The value $\phi_0$ must remain constant during the period of time it takes to complete the measurements. The uncorrected voltages on leads 66, 67, 66' and 67' are recorded and designated $V_{\Sigma I}(1)$, $V_{\Sigma Q}(1)$, $V_{\Delta I}(1)$ and $V_{\Delta Q}(1)$.

The input test signal is then switched by switch 43 to terminal 46 which provides a 90° phase advance path and the uncorrected signals for voltages on leads 66, 67, 66' and 67' are recorded and designated $V_{\Sigma I}(2)$, $V_{\Sigma Q}(2)$, $V_{\Delta I}(2)$, and $V_{\Delta Q}(2)$. The coefficients $K_1$ through $K_8$ are then computed. To ensure a reliable set of correction coefficients $K_1$ through $K_8$, an averaging procedure should be used. A number of sets of uncorrected data must be taken before computing the set of K's to be used for correcting the real world signal inputs. The computation of coefficients $K_1$ through $K_8$ is given by equations 9-18.

$$K_1=A[V_{\Sigma Q}(2)/D_\Sigma] \tag{9}$$

$$K_2=-A[V_{\Sigma I}(2)/D_\Sigma] \tag{10}$$

$$K_3=-A[V_{\Sigma Q}(1)/D_\Sigma] \tag{11}$$

$$K_4 = A[V_{\Sigma I}(1)/D_\Sigma] \quad (12)$$

$$D_\Sigma = V_{\Sigma I}(1)V_{\Sigma Q}(2) - V_{\Sigma Q}(1)V_{\Sigma I}(2) \quad (13)$$

$$K_5 = A[V_{\Delta Q}(2)/D_\Delta] \quad (14)$$

$$K_6 = -A[V_{\Delta I}(2)/D_\Delta] \quad (15)$$

$$K_7 = -A[V_{\Delta Q}(1)/D_\Delta] \quad (16)$$

$$K_8 = A[V_{\Delta I}(1)/D_\Delta] \quad (17)$$

$$D_\Delta = V_{\Delta I}(1)V_{\Delta Q}(2) - V_{\Delta Q}(1)V_{\Delta I}(2) \quad (18)$$

By way of example, gain and phase errors have been selected to illustrate the calibration procedure. In Table I, $G_\Sigma$ represents the gain common to both the in-phase and quadrature channel while $G_{\Sigma I}$ represents the gain variation in the in phase channel and $G_{\Sigma Q}$ represents the gain variation or error in the quadrature channel. The above distinction is also applicable to the phase designations in the sum and difference channel and the gains in the difference channel.

TABLE I
EXAMPLE CHANNEL PHASE & GAIN ERRORS

| Σ Channel | Δ Channel |
|---|---|
| $G_\Sigma = 0.8$ | $G_\Delta = 1.1$ |
| $G_{\Sigma I} = 0.9$ | $G_{\Delta I} = 1.2$ |
| $G_{\Sigma Q} = 1.2$ | $G_{\Delta Q} = 0.8$ |
| $\phi_\Sigma = 20°$ | $\phi_\Delta = -10°$ |
| $\phi_{\Sigma I} = 10°$ | $\phi_{\Delta I} = 20°$ |
| $\phi_{\Sigma Q} = -25°$ | $\phi_{\Delta Q} = -15°$ |

In Table I, the gain errors are voltage ratios and where the test voltage $V_T$ multiplied by $G_0$ equals A which in turn equals 1. The signal phase during the calibration procedure will alternate between 40° and 130° at couplers 36 and 37.

Table II lists the analytical expressions for the uncorrected signals at the inputs to correction circuits 68 and 68'.

TABLE II
UNCORRECTED SIGNAL VOLTAGE EQUATIONS $V_{\Sigma I} = AG_\Sigma G_{\Sigma I}\cos(\phi + \phi_\Sigma + \phi_{\Sigma I})$
$V_{\Sigma Q} = AG_\Sigma G_{\Sigma Q}\sin(\phi + \phi_\Sigma + \phi_{\Sigma Q})$
$V_{\Delta I} = AG_\Delta G_{\Delta I}\cos(\phi + \phi_\Delta + \phi_{\Delta I})$
$V_{\Delta Q} = AG_\Delta G_{\Delta Q}\sin(\phi + \phi_\Delta + \phi_{\Delta Q})$
$A = G_o V_T$ Table III lists the computed values of the uncorrected voltages at the initial phase condition, $\phi_0$, of the test signal from calibration signal generator 40 and then at initial phase plus 90° by way of switch 43.

TABLE III
VALUES OF UNCORRECTED SIGNAL VOLTAGE AT $\phi_o$ and $(\phi_o + 90°)$

| $\phi_o = 40°$ | $\phi_o = 130°$ |
|---|---|
| $V_{\Sigma I}(1) = 0.2463$ | $V_{\Sigma I}(2) = -0.6766$ |
| $V_{\Sigma Q}(1) = 0.5506$ | $V_{\Sigma Q}(2) = 0.7864$ |
| $V_{\Delta I}(1) = 0.8485$ | $V_{\Delta I}(2) = -1.0112$ |
| $V_{\Delta Q}(1) = 0.2278$ | $V_{\Delta Q}(2) = 0.8500$ |

Table IV lists the values of the eight correction coefficients computed from the values in Table III using equations (9)-(18).

TABLE IV
COMPUTED CORRECTION COEFFICIENTS

| $K_1 = 1.388890$ | $K_5 = 0.893316$ |
|---|---|
| $K_2 = 1.194950$ | $K_6 = 1.062690$ |
| $K_3 = -0.972059$ | $K_7 = -0.239363$ |
| $K_4 = 0.434928$ | $K_8 = 0.891704$ |

Table V lists the values of the uncorrected and corrected voltages as a function of the test signal phase ($\phi$) when the correction coefficients are fixed at the values in Table IV. When ($\phi$) equal 40° the corrected signals are such that $V'_{\Sigma Q}$ and $V'_{\Delta Q}$ are 0.

TABLE V
UNCORRECTED AND CORRECTED CHANNEL VOLTAGES AS A FUNCTION OF TEST SIGNAL PHASE

| TEST SIGNAL PHASE (DEG) $\phi$ | $V_{\Sigma I}$ | $V_{\Sigma Q}$ | $V_{\Delta I}$ | $V_{\Delta Q}$ | $V_{\Sigma I}'$ | $V_{\Sigma Q}'$ | $V_{\Delta I}'$ | $V_{\Delta Q}'$ |
|---|---|---|---|---|---|---|---|---|
| 0 | 0.6235 | −0.0837 | 1.2999 | −0.3719 | 0.7660 | −0.6428 | 0.7660 | −0.6428 |
| 10 | 0.5516 | 0.0837 | 1.2404 | −0.2278 | 0.8660 | −0.5000 | 0.8660 | −0.5000 |
| 20 | 0.4628 | 0.2485 | 1.1432 | −0.0767 | 0.9397 | −0.3420 | 0.9397 | −0.3420 |
| 30 | 0.3600 | 0.4057 | 1.0112 | 0.0767 | 0.9848 | −0.1736 | 0.9848 | −0.1736 |
| $\phi_o \rightarrow$ 40 | 0.2463 | 0.5506 | 0.8485 | 0.2278 | 1.0000 | 0.0000 | 1.0000 | 0.0000 |
| 50 | 0.1250 | 0.6788 | 0.6600 | 0.3719 | 0.9848 | 0.1736 | 0.9848 | 0.1736 |
| 60 | 0.0000 | 0.7864 | 0.4515 | 0.5047 | 0.9397 | 0.3420 | 0.9397 | 0.3420 |
| 70 | −0.1250 | 0.8701 | 0.2292 | 0.6223 | 0.8660 | 0.5000 | 0.8660 | 0.5000 |
| 80 | −0.2463 | 0.9273 | 0.0000 | 0.7209 | 0.7660 | 0.6428 | 0.7660 | 0.6428 |
| 90 | −0.3600 | 0.9563 | −0.2292 | 0.7976 | 0.6428 | 0.7660 | 0.6428 | 0.7660 |
| 100 | −0.4628 | 0.9563 | ″0.4515 | 0.8500 | 0.5000 | 0.8660 | 0.5000 | 0.8660 |
| 110 | −0.5516 | 0.9273 | −0.6600 | 0.8767 | 0.3420 | 0.9397 | 0.3420 | 0.9397 |
| 120 | −0.6235 | 0.8701 | −0.8485 | 0.8767 | 0.1736 | 0.9848 | 0.1736 | 0.9848 |
| $\phi_o +90° \rightarrow$ 130 | −0.6766 | 0.7864 | −1.0112 | 0.8500 | 0.0000 | 1.0000 | 0.0000 | 1.0000 |
| 140 | −0.7091 | 0.6788 | −1.1432 | 0.7976 | −0.1736 | 0.9848 | −0.1736 | 0.9848 |
| 150 | −0.7200 | 0.5506 | −1.2404 | 0.7209 | −0.3420 | 0.9397 | −0.3420 | 0.9397 |
| 160 | −0.7091 | 0.4057 | −1.2999 | 0.6223 | −0.5000 | 0.8660 | −0.5000 | 0.8660 |
| 170 | −0.6766 | 0.2485 | −1.3200 | 0.5047 | −0.6428 | 0.7660 | −0.6428 | 0.7660 |
| 180 | −0.6235 | 0.0837 | −1.2999 | 0.3719 | −0.7660 | 0.6428 | −0.7660 | 0.6428 |
| 190 | −0.5516 | −0.0837 | −1.2404 | 0.2278 | −0.8660 | 0.5000 | −0.8660 | 0.5000 |
| 200 | −0.4628 | −0.2485 | −1.1432 | 0.0767 | −0.9397 | 0.3420 | −0.9397 | 0.3420 |
| 210 | −0.3600 | −0.4057 | −1.0112 | −0.0767 | −0.9848 | 0.1737 | −0.9848 | 0.1737 |
| 220 | −0.2463 | −0.5506 | −0.8485 | −0.2278 | −1.0000 | 0.0000 | −1.0000 | 0.0000 |
| 230 | −0.1250 | −0.6788 | −0.6600 | −0.3719 | −0.9848 | −0.1736 | −0.9848 | −0.1736 |
| 240 | −0.0000 | −0.7864 | −0.4515 | −0.5047 | −0.9397 | −0.3420 | −0.9397 | −0.3420 |

TABLE V-continued
UNCORRECTED AND CORRECTED CHANNEL VOLTAGES AS A FUNCTION OF TEST SIGNAL PHASE

| TEST SIGNAL PHASE (DEG) $\phi$ | $V_{\Sigma I}$ | $V_{\Sigma Q}$ | $V_{\Delta I}$ | $V_{\Delta Q}$ | $V_{\Sigma I}'$ | $V_{\Sigma Q}'$ | $V_{\Delta I}'$ | $V_{\Delta Q}'$ |
|---|---|---|---|---|---|---|---|---|
| 250 | 0.1250 | −0.8701 | −0.2292 | −0.6223 | −0.8660 | −0.5000 | −0.8660 | −0.5000 |
| 260 | 0.2463 | −0.9273 | −0.0000 | −0.7209 | −0.7660 | −0.6428 | −0.7660 | −0.6428 |
| 270 | 0.3600 | −0.9563 | 0.2292 | −0.7975 | −0.6428 | −0.7660 | −0.6428 | −0.7660 |
| 280 | 0.4628 | −0.9563 | 0.4515 | −0.8500 | −0.5000 | −0.8660 | −0.5000 | −0.8660 |
| 290 | 0.5515 | −0.9273 | 0.6600 | −0.8767 | −0.3420 | −0.9397 | −0.3420 | −0.9397 |
| 300 | 0.6235 | −0.8701 | 0.8485 | −0.8767 | −0.1737 | −0.9848 | −0.1737 | −0.9848 |
| 310 | 0.6766 | −0.7864 | 1.0112 | −0.8500 | −0.0000 | −1.0000 | −0.0000 | −1.0000 |
| 320 | 0.7091 | −0.6788 | 1.1432 | −0.7976 | 0.1736 | −0.9848 | 0.1736 | −0.9848 |
| 330 | 0.7200 | −0.5506 | 1.2404 | −0.7209 | 0.3420 | −0.9397 | 0.3420 | −0.9397 |
| 340 | 0.7091 | −0.4057 | 1.2999 | −0.6223 | 0.5000 | −0.8660 | 0.5000 | −0.8660 |
| 350 | 0.6766 | −0.2485 | 1.3200 | −0.5048 | 0.6428 | −0.7660 | 0.6428 | −0.7660 |
| 360 | 0.6235 | −0.0837 | 1.2999 | −0.3719 | 0.7660 | −0.6428 | 0.7660 | −0.6428 |

Figure 9:
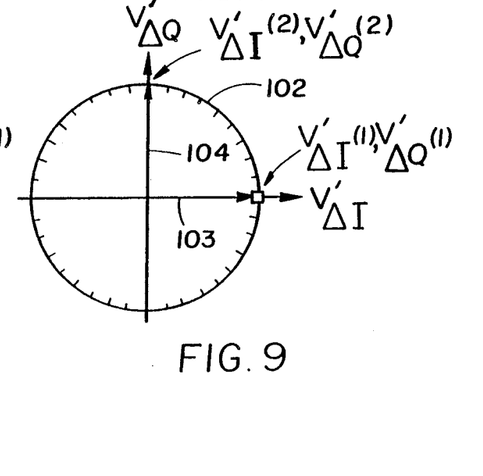
FIG. 9 is a graph of the difference channel with a corrected output.

The magnitudes of the corrected signals are all equal and independent of $\phi$ and the phases of the corrected complex outputs are linearly related to the test signal phase. All corrected signal values obey equations 5–8. To further illustrate the relationships between the uncorrected and corrected output signals, reference is made to FIGS. 5–9, which graphs the complex values given in Table V. As expected, the corrected complex signals shown in FIGS. 7 and 9 are two perfect circles of equal radius and equal phase.

Figures 5, 6, 8:
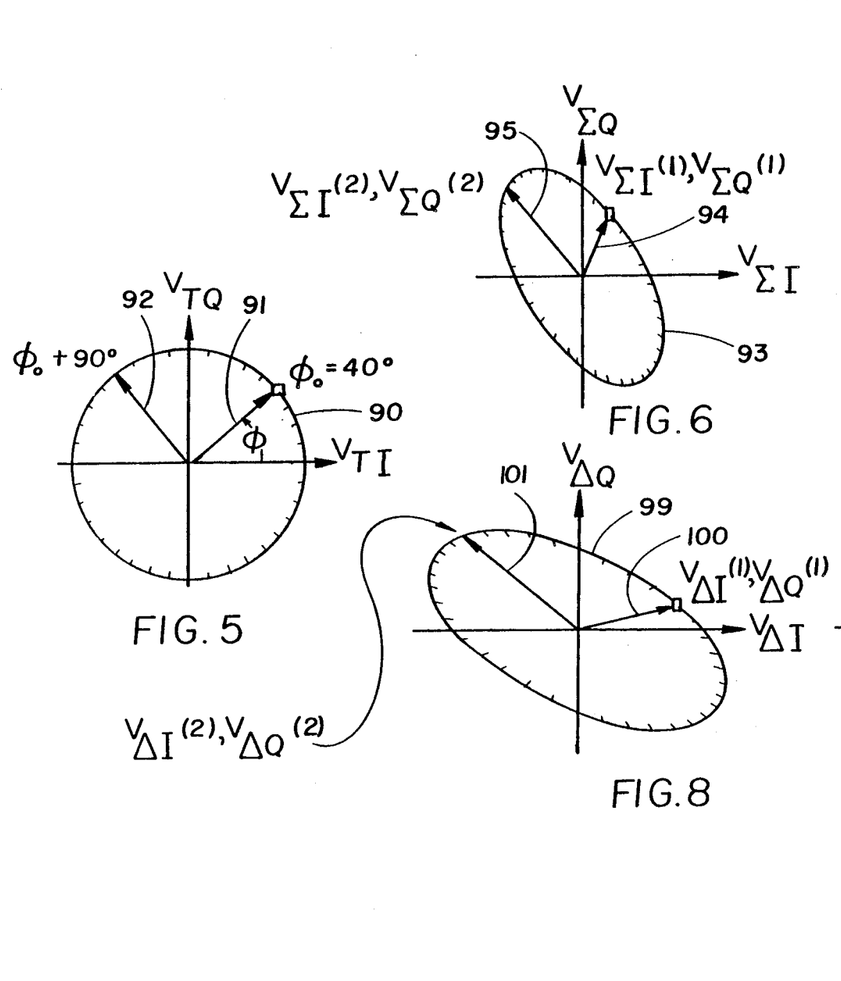
FIG. 5 is a graph of the test signal.
FIG. 6 is a graph of the sum channel with an uncorrected output.
FIG. 8 is a graph of the difference channel with an uncorrected output.

FIG. 5 is a graph of the test signal. In FIG. 5, the ordinate represents the voltage of the test signal quadrature component and the abscissa represents the voltage of the test signal in-phase component. Curve 90 shows the voltage of the test signal with an initial phase of 40° shown by radius 91 and at an initial phase plus 90° shown by radius 92.

FIG. 6 is a graph of the sum channel with an uncorrected output shown by curve 93. In FIG. 6 the ordinate represents $V_{\Sigma Q}$ and the abscissa represents $V_{\Sigma I}$. The corresponding voltages with an initial test signal phase equal to 40° is shown by radius 94 and with an additional 90° is shown by radius 95.

Figure 7:
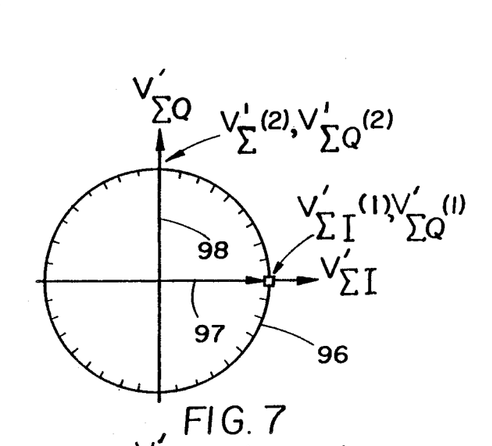
FIG. 7 is a graph of the sum channel with a corrected output.

FIG. 7 is a graph of the sum channel with a corrected output shown by curve 96. In FIG. 7 the ordinate represents $V'_{\Sigma Q}$ and the abscissa represents $V'_{\Sigma I}$. The corrected voltages are now shown for an initial phase of 40° of the test signal by radius 97 and now has a phase of 0°. The Corrected voltages are shown for an initial phase of 130° of the test signal by radius 98 with a phase of 90°.

FIG. 8 is a graph of the difference channel with an uncorrected output shown by curve 99. In FIG. 8 the ordinate represents $V_{\Delta Q}$ and the abscissa represents $V_{\Delta I}$. The uncorrected output for an initial phase of 40° of the test signal is shown by radius 100. The uncorrected output for an initial phase of 130° is shown by radius 101.

FIG. 9 is a graph of the difference channel with a corrected output shown by curve 102. In FIG. 9 the ordinate represents $V'_{\Delta Q}$ and the abscissa represents $V'_{\Delta I}$. The corrected output corresponding to the test signal with initial phase of 40° is shown by radius 103 and the corrected output for an initial phase of 130° is shown by radius 104.

An apparatus and method for closed loop digital compensation of phase and gain drift in the channels of a monopulse receiver has been described comprising the steps of first injecting a signal of known amplitude and arbitrary phase into the quadrature channel, second measuring the uncorrected in-phase and quadrature channel voltages to provide values $I_1$ and $Q_1$, third inserting a 90° phase shift in the first signal to provide a second signal, fourth injecting said second signal into the quadrature channel, fifth measuring the uncorrected in-phase and quadrature channel voltages to provide values $I_2$ and $Q_2$, sixth computing for correction coefficients $K_1$, $K_2$, $K_3$ and $K_4$ from the values $I_1$, $Q_1$, $I_2$ and $Q_2$, and seventh applying the coefficients to the output signals of the in-phase and quadrature channel voltages to provide third and fourth signals having compensation for phase and gain drift.

What is claimed is:

1. In a monopulse radar having sum $\Sigma$ and difference $\Delta$ channels for providing angular measurements of a radar target from the radar, said sum channel including a first quadrature detector, said difference channel including a second quadrature detector, each of said first and second detectors having an in-phase I channel and a quadrature Q channel;

a method for digital compensation of phase and gain drift in said first and second detectors comprising the steps of:

first, injecting a first signal of known amplitude and arbitrary phase into both said first and second detectors;

second, measuring the uncorrected voltage outputs of said in-phase I and quadrature Q channels of said first detector and said second detector to provide values $V_{\Sigma I}(1)$ from said in-phase channel of said first detector and $V_{\Sigma Q}(1)$ from said quadrature channel of said first detector and $V_{\Delta I}(1)$ from said in-phase channel of said second detector and $V_{\Delta Q}(1)$ from said quadrature channel of said second detector;

third, inserting a 90° phase shift in said first signal to provide a second signal;

fourth, injecting said second signal into both said first and said second detectors;

fifth, measuring the uncorrected voltage outputs of said in-phase I and quadrature Q channels of said first and second detectors to provide values $V_{\Sigma I}(2)$ from said in-phase channel of said first detector and $V_{\Sigma Q}(2)$ from quadrature channel of said first detector and $V_{\Delta I}(2)$ from said in-phase channel of said second detector and $V_{\Delta Q}(2)$ from said quadrature channel of said second detector;

sixth, computing directly from said values $V_{\Sigma I}(1)$, $V_{\Sigma Q}(1)$, $V_{\Sigma I}(2)$ and $V_{\Sigma Q}(2)$ a first set of four correction coefficients $K_1$, $K_2$, $K_3$ and $K_4$;

seventh, computing directly from said values $V_{\Delta I}(1)$, $V_{\Delta Q}(1)$, $V_{\Delta I}(2)$ and $V_{\Delta Q}(2)$ a second set of four correction coefficients $K_5$, $K_6$, $K_7$ and $K_8$;

eighth, removing said first and second signals from both said first and second quadrature detectors;

ninth, applying said first set of coefficients to the output signals of said in-phase and quadrature channels of said first detector to provide third and fourth signals having compensation for phase and gain drift; and tenth, applying said second set of coefficients to the output signals of said in-phase and quadrature channels of said second detector to provide fifth and sixth signals having compensation for phase and gain drift.

2. The method of claim 1 wherein:

said sixth step of computing from said values $V_{\Sigma I}(1)$, $V_{\Sigma Q}(1)$, $V_{93 I}(2)$ and $V_{\Sigma Q}(2)$ a first set of four correction coefficients $K_1$, $K_2$, $K_3$ and $K_4$ includes:

computing said first set of coefficients from the relationships:

$$K_1 = A[V_{\Sigma Q}(2)/D_\Sigma]$$

$$K_2 = -A[V_{\Sigma I}(2)/D_\Sigma]$$

$$K_3 = -A[V_{\Sigma Q}(1)/D_\Sigma]$$

$$K_4 = A[V_{\Sigma I}(1)/D_\Sigma]$$

where:

$D_\Sigma = V_{\Sigma I}(1)V_{\Sigma Q}(2) - V_{\Sigma Q}(1)V_{\Sigma I}(2)$; and A equals the desired corrected signal amplitude.

3. The method of claim 1 wherein:

said seventh step of computing from said values $V_{\Delta I}(1)$, $V_{\Delta Q}(1)$, $V_{\Delta I}(2)$ and $V_{\Delta Q}(2)$ a second set of four correction coefficients $K_5$, $K_6$, $K_7$ and $K_8$ includes:

computing said second set of coefficients from the relationships:

$$K_5 = A[V_{\Delta Q}(2)/D_\Delta]$$

$$K_6 = -A[V_{\Delta I}(2)/D_\Delta]$$

$$K_7 = -A[V_{\Delta Q}(1)/D_\Delta]$$

$$K_8 = A[V_{\Delta I}(1)/D_\Delta]$$

where:

$D_\Delta = V_{\Delta I}(1)V_{\Delta Q}(2) - V_{\Delta Q}(1)V_{\Delta I}(2)$; and A equals the desired corrected signal amplitude.

4. The method of claim 2 wherein:

said seventh step of computing from said values $V_{\Delta I}(1)$, $V_{\Delta Q}(1)$, $V_{\Delta I}(2)$ and $V_{\Delta Q}(2)$ a second set of four correction coefficients $K_5$, $K_6$, $K_7$ and $K_8$ includes:

computing said second set of coefficients from the relationships:

$$K_5 = A[V_{\Delta Q}(2)/D_\Delta]$$

$$K_6 = -A[V_{\Delta I}(2)/D_\Delta]$$

$$K_7 = -A[V_{\Delta Q}(1)/D_\Delta]$$

$$K_8 = A[V_{\Delta I}(1)/D_\Delta]$$

where:

$D_{66} = V_{\Delta I}(1)V_{\Delta Q}(2) - V_{\Delta Q}(1)V_{\Delta I}(2)$; and

A equals the desired corrected signal amplitude.

5. The method of claim 4 wherein:

said ninth step of applying said first set of coefficients to the output signals of said in-phase and quadrature channels of said first detector includes:

applying said first set of coefficients according to the relationships:

$$V'_{\Sigma I} = K_1 V_{\Sigma I} + K_2 V_{\Sigma Q}, \text{ and}$$

$$V'_{\Sigma Q} = K_4 V_{\Sigma Q} + K_3 V_{\Sigma I}$$

where:

$V_{\Sigma I}$ and $V_{\Sigma Q}$ are the output signals, respectively, of said in-phase and quadrature channels of said first detector; and $V'_{\Sigma I}$ and $V'_{\Sigma Q}$ are said third and fourth signals, respectively; and wherein:

said tenth step of applying said second set of coefficients to the output signals of said in-phase and quadrature channels of said second detector includes:

applying said second set of coefficients according to the relationships:

$$V'_{\Delta I} = K_5 V_{\Delta I} + K_6 V_{\Delta Q}, \text{ and}$$

$$V'_{\Delta Q} = K_7 V_{\Delta I} + K_8 V_{\Delta Q}$$

where:

$V_{\Delta I}$ and $V_{\Delta Q}$ and the output signals, respectively, of said in-phase and quadrature channels of said second detector, and $V'_{\Delta I}$ and $V'_{\Delta Q}$ are said fifth and sixth signals, respectively.

6. In a monopulse radar having sum $\Sigma$ and difference $\Delta$ channels for providing angular measurements of a radar target from the radar, said sum channel including a first quadrature detector, said difference channel including a second quadrature detector, each of said first and second detectors having an in-phase I channel and a quadrature Q channel;

a method for digital compensation of phase and gain drift in said first and second detectors comprising the steps of:

first, injecting a first signal of known amplitude and arbitrary phase into both said first and second detectors;

second, measuring the uncorrected voltage outputs of said in-phase I and quadrature Q channels of both said first and said second detectors to provide values $V_{\Sigma I}(1)$ from said in-phase channel of said first detector and $V_{\Sigma Q}(1)$ from said quadrature channel of said first detector and $V_{\Delta I}(1)$ from said in-phase channel of said second detector and $V_{\Delta Q}(1)$ from said quadrature channel of said second detector;

third, inserting a 90° phase shift in said first signal to provide a second signal;

fourth, injecting said second signal into both said first and said second detectors;

fifth, measuring the uncorrected voltage outputs of said in-phase I and quadrature Q channels of both said first and second detectors to provide values $V_{\Sigma I}(2)$ and $V_{\Sigma Q}(2)$ from said first detector and $V_{\Delta I}(2)$ and $V_{\Delta Q}(2)$ from said second detector;

sixth, computing directly from said values $V_{\Sigma I}(1)$, $V_{\Sigma Q}(1)$, $V_{\Sigma I}(2)$ and $V_{\Sigma Q}(2)$ a first set of four correction coefficients $K_1$, $K_2$, $K_3$ and $K_4$;

seventh, computing directly from said values $V_{\Delta I}(1)$, $V_{\Delta Q}(1)$, $V_{\Delta I}(2)$ and $V_{\Delta Q}(2)$ a second set of four correction coefficients $K_5$, $K_6$, $K_7$ and $K_8$;

eighth, repeating said first, second, third, fourth, fifth, sixth, and seventh steps a plurality of times to provide a plurality of values of said $K_1$, $K_2$, $K_3$ and $K_4$ of said first set of correction coefficients and $K_5$, $K_6$, $K_7$ and $K_8$ of said second set of correction coefficients;

ninth, computing from said plurality of values of $K_1$, $K_2$, $K_3$ and $K_4$ a third set of correction coefficients $K_1$av., $K_2$av., $K_3$av. and $K_4$av., each of said coefficients of said third set comprising the average value of corresponding coefficients of said plurality of values of said first set;

tenth, computing from said plurality of values of $K_5$, $K_6$, $K_7$ and $K_8$ a fourth set of correction coefficients $K_5$av., $K_6$av., $K_7$av. and $K_8$av., each of said coefficients of said fourth set comprising the average value of corresponding coefficients of said plurality of values of said second set;

eleventh, removing said first and second signals from both said first and said second detectors;

twelfth, applying said third set of correction coefficients to the output signals of said in-phase and quadrature channels of said first detector to provide third and fourth signals having compensation for phase gain and drift; and thirteenth, applying said fourth set of correction coefficients to the output signals of said in-phase and quadrature channels of said second detector to provide fifth and sixth signals having compensation for phase gain and drift.

7. The method as claimed in claim 6 wherein:
said sixth step of computing from said values $V_{\Sigma I}(1)$, $V_{\Sigma Q}(1)$, $V_{\Sigma I}(2)$ and $V_{\Sigma Q}(2)$ a first set of four correction coefficients $K_1$, $K_2$, $K_3$ and $K_4$ includes:
computing said first set of coefficients from the relationships:

$$K_1 = A[V_{\Sigma Q}(2)/D_\Sigma]$$

$$K_2 = -A[V_{\Sigma I}(2)/D_\Sigma]$$

$$K_3 = -A[V_{\Sigma Q}(1)/D_\Sigma]$$

$$K_4 = A[V_{\Sigma I}(1)/D_\Sigma]$$

where:
$D_\Sigma V_{\Sigma I}(1)V_{\Sigma Q}(2) - V_{\Sigma Q}(1)V_{\Sigma I}(2)$; and A equals the desired corrected signal amplitude; and wherein:

said seventh step of computing from said values $V_{\Delta I}(1)$, $V_{\Delta Q}(1)$, $V_{\Delta I}(2)$ and $V_{\Delta Q}(2)$ a second set of four correction coefficients $K_5$, $K_6$, $K_7$ and $K_8$ includes:

computing said second set of coefficients from the relationships:

$$K_5 = A[V_{\Delta Q}(2)/D_\Delta]$$

$$K_6 = -A[V_{\Delta I}(2)/D_\Delta]$$

$$K_7 = -A[V_{\Delta Q}(1)/D_\Delta]$$

$$K_8 = A[V_{\Delta I}(1)/D_\Delta]$$

wherein:
$D_\Delta = V_{\Delta I}(1)V_{\Delta Q}(2) - V_{\Delta Q}(1)V_{\Delta I}(2)$; and
A equals the desired corrected signal amplitude.

8. The method of claim 7 wherein:
said twelfth step of applying said third set of correction signals to the outputs of said in-phase and quadrature channels of said first detector includes:
applying said third set of coefficients according to the relationships:

$$V'_{\Sigma I} = K_1 av. V_{\Sigma I} + K_2 av. V_{\Sigma Q}, \text{ and}$$

$$V'_{\Sigma Q} = K_4 av. V_{\Sigma Q} + K_3 av. V_{\Sigma I}$$

where:
$V_{\Sigma I}$ and $V_{\Sigma Q}$ are the output signals, respectively, of said in-phase and quadrature channels of said first detector; and
$V'_{\Sigma I}$ and $V'_{\Sigma Q}$ are said third and fourth signals, respectively;
and wherein:
said thirteenth step of applying said fourth set of correction coefficients to the ptput signals of said in-phase and quadrature channels of said second detector includes:
applying said fourth set of coefficients according to the relationships:

$$V'_{\Sigma I} = K_5 av. V_{\Sigma I} + K_6 av. V_{\Sigma Q}, \text{ and}$$

$$V'_{\Delta Q} = K_7 av. V_{\Delta I} + K_8 av. V_{\Delta Q}$$

where:
$V_{\Delta I}$ and $V_{\Delta Q}$ are the output signals, respectively, of said in-phase and quadrature channels of said second detector, and
$V'_{\Delta I}$ and $V'_{\Delta Q}$ are said fifth and sixth signals, respectively.

* * * * *